US010682897B2

(12) United States Patent
Lucht et al.

(10) Patent No.: US 10,682,897 B2
(45) Date of Patent: Jun. 16, 2020

(54) METHODS AND SYSTEMS TO CONTROL AN ENGINE OF A TRANSPORT REFRIGERATION UNIT

(71) Applicant: THERMO KING CORPORATION, Minneapolis, MN (US)

(72) Inventors: Erich Albert Lucht, Arden Hills, MN (US); Art Ambaruch, Prior Lake, MN (US)

(73) Assignee: Thermo King Corporation, Minneapolis, MN (US)

( * ) Notice: Subject to any disclaimer, the term of this patent is extended or adjusted under 35 U.S.C. 154(b) by 209 days.

(21) Appl. No.: 14/648,096

(22) PCT Filed: Nov. 27, 2013

(86) PCT No.: PCT/US2013/072357
§ 371 (c)(1),
(2) Date: May 28, 2015

(87) PCT Pub. No.: WO2014/085672
PCT Pub. Date: Jun. 5, 2014

(65) Prior Publication Data
US 2015/0314670 A1    Nov. 5, 2015

Related U.S. Application Data

(60) Provisional application No. 61/730,601, filed on Nov. 28, 2012.

(51) Int. Cl.
B60H 1/32        (2006.01)
F25B 49/02       (2006.01)
(Continued)

(52) U.S. Cl.
CPC ....... B60H 1/3208 (2013.01); B60H 1/00771 (2013.01); B60H 1/3222 (2013.01);
(Continued)

(58) Field of Classification Search
CPC ... B60W 10/06; B60W 20/00; Y02T 10/7291; Y02T 10/7283; Y02T 10/7275;
(Continued)

(56) References Cited

U.S. PATENT DOCUMENTS 4,236,381 A   12/1980   Imral et al.
4,537,045 A    8/1985   Mayer
(Continued)

FOREIGN PATENT DOCUMENTS

CN         2837132       11/2006
CN       101292126       10/2008
(Continued)

OTHER PUBLICATIONS

Supplementary European Search Report issued in corresponding European application No. 13859453.6 dated Sep. 9, 2016 (9 pages).
(Continued)

Primary Examiner — Sizo B Vilakazi
(74) Attorney, Agent, or Firm — Hamre, Schumann, Mueller & Larson, P.C.

(57) ABSTRACT

Systems and methods to control a prime mover of a transport refrigeration system are disclosed. A controller may be configured to receive input from various information sources including a global satellite positioning system and/or a human machine interface. The controller can be configured to select a prime mover operation mode based on the input received. In some embodiment, the controller can select a noise reduction operation mode when the TRU is located in a noise regulated area, and can select a fuel efficient mode when the TRU is located outside of the noise regulated areas. In some embodiments, the noise reduction operation mode may include increasing a speed of the prime mover in a soft sloped ramp. In some embodiments, the operation modes can include prime mover operation instructions containing
(Continued)

parameters of fuel injection of the prime mover. The operation instructions can be sent to an ECU to execute.

22 Claims, 10 Drawing Sheets

(51) Int. Cl.
*F02D 29/02* (2006.01)
*F02D 41/02* (2006.01)
*B60H 1/00* (2006.01)
*B60P 3/20* (2006.01)
*F02D 31/00* (2006.01)
*F02M 26/23* (2016.01)

(52) U.S. Cl.
CPC .............. *B60H 1/3232* (2013.01); *B60P 3/20* (2013.01); *F02D 29/02* (2013.01); *F02D 41/021* (2013.01); *F25B 49/022* (2013.01); *F25B 49/025* (2013.01); *F02D 31/007* (2013.01); *F02M 26/23* (2016.02)

(58) Field of Classification Search
CPC .. B60H 1/3208; B60H 1/3222; B60H 1/3232; F25B 49/025; F25B 49/022; B60P 3/20
See application file for complete search history.

(56) References Cited

U.S. PATENT DOCUMENTS

| | | | |
|---|---|---|---|
| 4,663,725 | A | 5/1987 | Truckenbrod et al. |
| 5,376,866 | A | 12/1994 | Erdman |
| 5,557,938 | A | 9/1996 | Hanson et al. |
| 5,629,568 | A | 5/1997 | Mertens |
| 5,703,410 | A | 12/1997 | Maekawa |
| 5,950,439 | A | 9/1999 | Peterson et al. |
| 6,018,200 | A | 1/2000 | Anderson et al. |
| 6,112,151 | A | 8/2000 | Kruse |
| 6,196,009 | B1 | 3/2001 | Nishi et al. |
| 6,453,693 | B1 | 9/2002 | Ewert et al. |
| 7,525,270 | B2 | 4/2009 | Washino et al. |
| 7,878,013 | B2 | 2/2011 | Matsuno et al. |
| 7,900,462 | B2 | 3/2011 | Hegar et al. |
| 7,918,194 | B2 | 4/2011 | Kojima |
| 2007/0155552 | A1 | 7/2007 | De Cloe |
| 2007/0195079 | A1* | 8/2007 | Boudewyns ....... B60H 1/00985 345/207 |
| 2008/0208393 | A1* | 8/2008 | Schricker ................. G08G 1/20 701/1 |
| 2009/0254239 | A1* | 10/2009 | Daum .................... B61L 3/006 701/31.4 |
| 2010/0152998 | A1* | 6/2010 | Schwarzmann ....... G01C 21/00 701/532 |
| 2011/0257869 | A1* | 10/2011 | Kumar .................... B61L 3/006 701/103 |
| 2012/0000212 | A1 | 1/2012 | Sanders et al. |

FOREIGN PATENT DOCUMENTS

| | | | |
|---|---|---|---|
| EP | 0545027 | | 6/1993 |
| EP | 0545027 A1 * | | 6/1993 .......... F02D 31/007 |
| EP | 1950509 | | 7/2008 |
| EP | 1990222 | | 11/2008 |
| EP | 2072299 | | 6/2009 |
| JP | 10178705 | | 6/1998 |
| JP | 2002155783 | | 5/2002 |
| JP | 2003279217 | | 10/2003 |
| KR | 1020070039206 | | 11/2007 |
| WO | 2012102787 | | 8/2012 |
| WO | 2012138500 | | 10/2012 |

OTHER PUBLICATIONS

Chinese Office Action issued in corresponding Chinese Application No. 201380071662.1 dated Mar. 17, 2017 (9 pages).
International Search Report for International Application No. PCT/US2013/072357, dated Mar. 13, 2014 (3 pages).
Written Opinion for International Application No. PCT/US2013/072357, dated Mar. 13, 2014 (6 pages).
James R. Solberg: "Regulation of the liquid-mass-fraction of refrigerant exiting an evaporator"; M.S. Thesis, University of Illinois at Urbana-Champaign, 1999, http://james.solberg.tripod.com/MS_Thesis_html.
"Maximum Performance, Minima Environmental Impact"; Trailer Refrigeration, Single and Multi Temperature, Thermo King, Ingersoll Rand, pp. 1-24.
Cloe et al.: "The Constant Speed Power Take Off (CS-PTO)"; Technische Universiteit Eindhoven, The Netherlands, pp. 1-13.
European Office Action issued in corresponding European Application No. 13859453.6 dated Apr. 12, 2018 (4 pages).

* cited by examiner

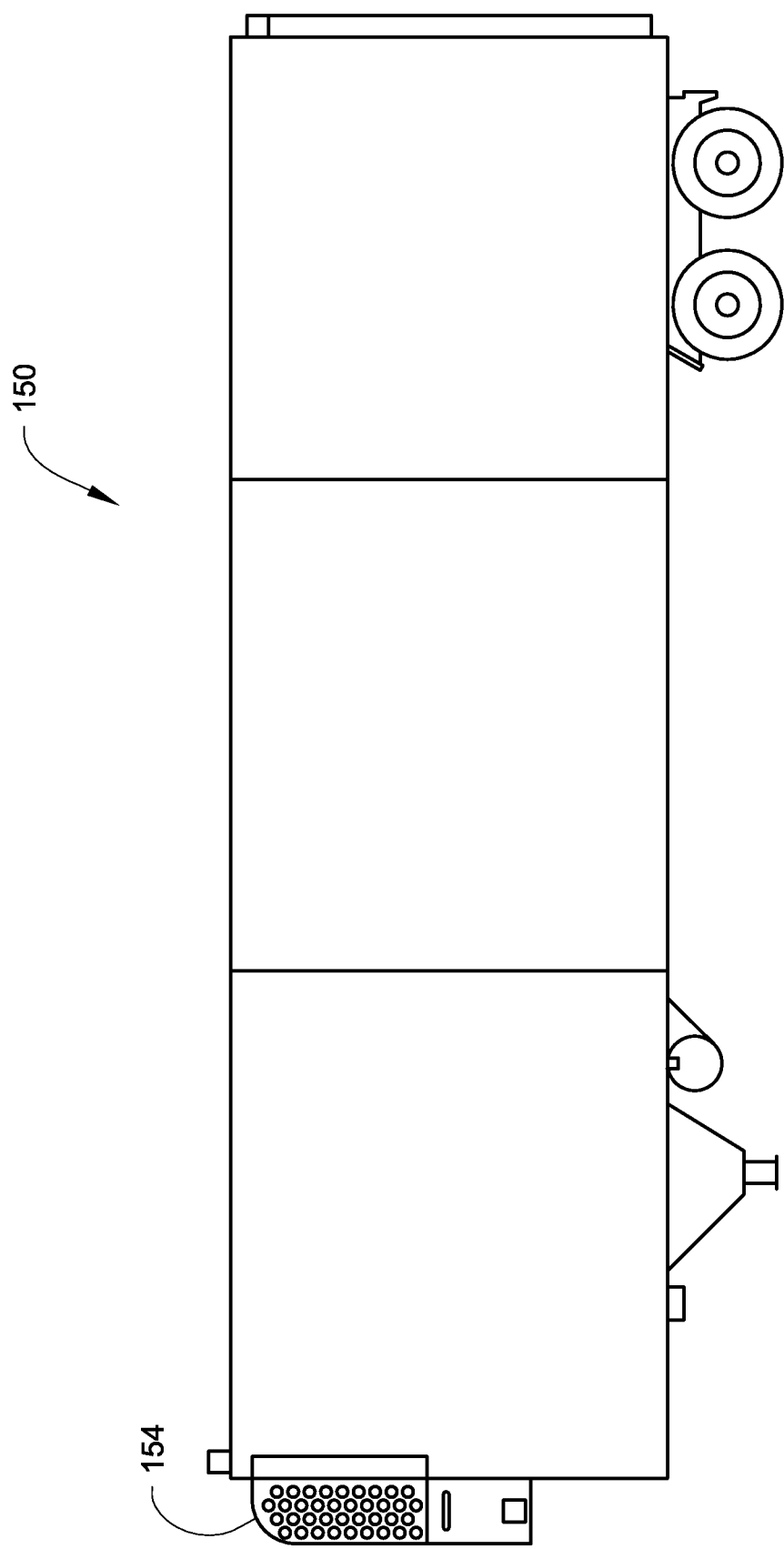

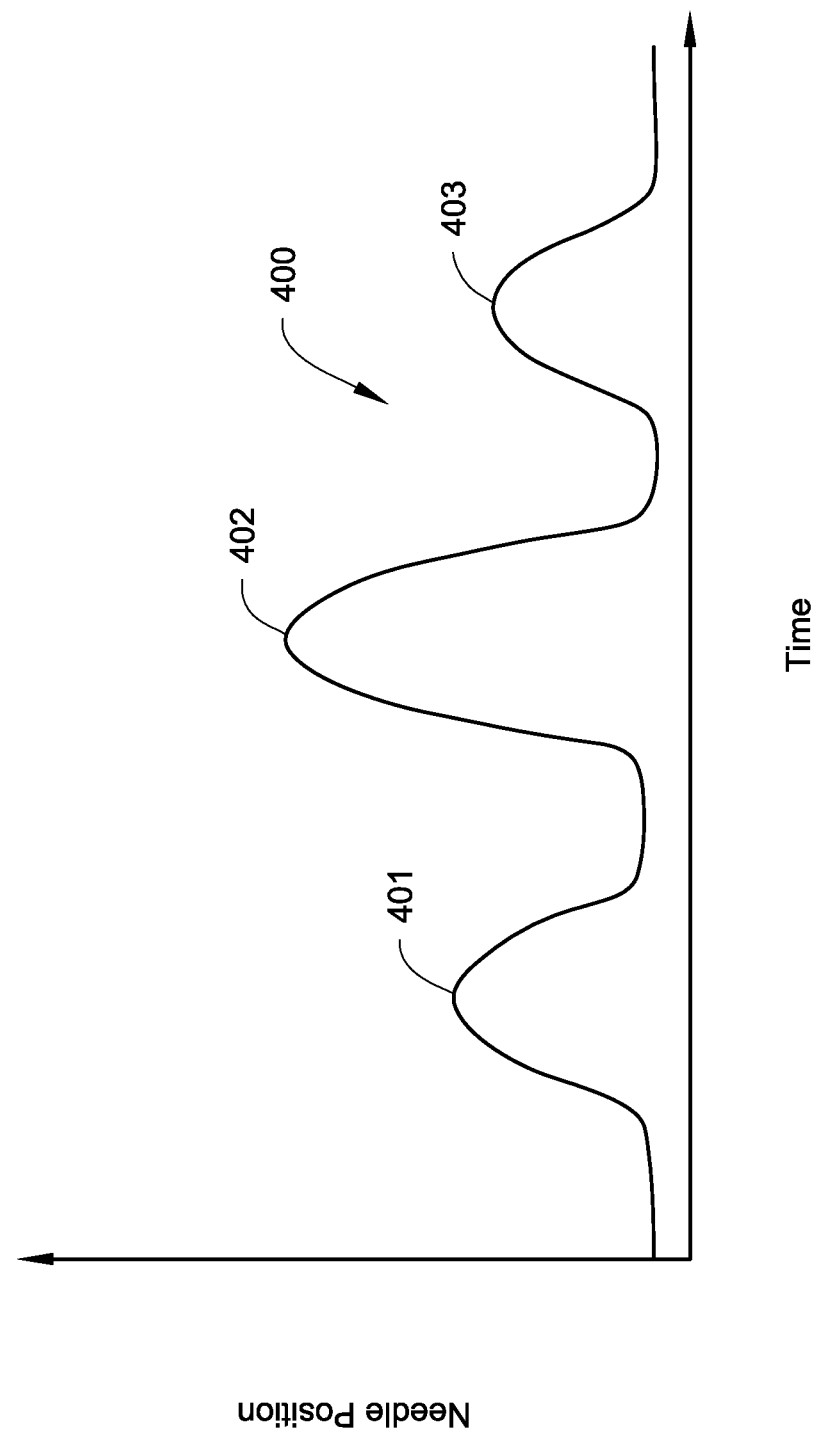

METHODS AND SYSTEMS TO CONTROL AN ENGINE OF A TRANSPORT REFRIGERATION UNIT

FIELD OF TECHNOLOGY

The embodiments disclosed herein generally relate to a transport refrigeration unit (TRU) for a transport refrigeration system. More specifically, the embodiments disclosed herein relate to methods and systems to control the operation of a prime mover of the TRU or a TRU generator set of a transport refrigeration system.

BACKGROUND

Refrigerated transport units can include mobile containers, such as a trailer unit, a container, or a railway car that may have a transport refrigeration system to control a temperature of an internal space of the containers. Refrigerated transport units can be used to transport perishable products, and the temperature of the refrigerated transport units may be controlled to limit loss of the cargo during transportation. The temperature of the refrigerated transport units may be controlled by a TRU.

Some TRUs can include a generator set (genset) that supplies power to a compressor or other electronic components of the transport refrigeration system. These gensets are typically attached directly to the container or container chassis, and include a prime mover (such as an engine) to power the generator. The prime mover is typically a fuel-powered engine such as a diesel engine, a gasoline engine or a natural gas engine. In some other configurations, the prime mover can be mechanically coupled to the compressor of the TRU to drive the compressor of the TRU, for example, by a belt drive. In these configurations, the genset is generally not required.

The fuel combustion in combustion chambers of the engine can generate power to drive the engine. However, the combustion of fuel in the fuel-powered engine can emit environmentally harmful exhaust and particles such as oxides of nitrogen ($NO_x$), carbon monoxide (CO), hydrocarbon (HC), carbon dioxide ($CO_2$) and particulate matter (PM), and can also produce noise.

The composition of the engine exhaust often may have to comply with emission regulations. For example, the exhaust of the TRU engine may have to meet or exceed the requirement set forth by the United States Environmental Protection Agency, as well as requirements set forth by other governments such as in Japan, Europe countries, etc. In some places, the noise level of the engine may also be regulated. For example, in a residential area, zoning regulations may restrict the noise level of the engine. In addition, in some situations, for example during a resting period taken by the TRU vehicle operator, noise reduction may also be desired.

Devices have been developed to reduce the environmental harmful exhaust and noise of the engine. For a diesel engine, such devices may include for example turbocharger, an exhaust gas recirculation (EGR), an EGR cooler, a diesel particulate filter (DPF), a diesel oxidation catalyst (DOC), and a common rail (CR) fuel injection system. The turbocharger can help reduce PM, $NO_x$, HC, CO, and $CO_2$. The EGR and/or EGR cooler can help reduce $NO_x$. The DOC can help reduce unburned HC. The DPF can help reduce PM. A diesel engine equipped with these devices may be able to comply with the emission regulations; however these devices may also increase the initial equipment cost and associated reoccurring maintenance costs for the diesel engine.

The CR system generally includes a high pressure fuel pump. The high pressure fuel pump can pressurize the fuel and pump the pressurized fuel to a high pressure fuel rail (the common rail) that feeds all of the individual fuel injectors. An engine control unit (ECU) can control the individual fuel injector so as to control fuel injection parameters, such as quantity, timing and duration of the fuel injection by each fuel injector into the corresponding combustion chamber. The ECU can also be configured to control an air inlet and the turbocharger so as to control an amount of air supplied to the combustion chambers of the engine. By controlling the amount of air supply and fuel injection characteristics, the ECU can control the engine performance.

SUMMARY

Methods and systems to control a prime mover of a transport refrigeration unit (TRU) or a TRU genset for a transport refrigeration system are disclosed. One method may include obtaining information from an information source and determining a prime mover operation mode. The prime mover operation mode may be selected, for example, from a fuel efficiency mode, a noise reduction mode, an emission modulation mode and a hybrid mode. The method may further include obtaining a prime mover instruction set that is calibrated for the selected prime mover operation mode and operating the prime mover according to the prime mover instruction set.

In some embodiments, the prime mover instruction set that is calibrated for the noise reduction mode may include a soft ramped speed increase for the prime mover, for example increasing the speed of the prime mover at about 5% of a maximum RPM of the prime mover per second.

In some embodiments, the prime mover operation instruction set may include duration, timing and rate of fuel injection for an injector of the prime mover. The duration, timing and rate of fuel injection may be calibrated to operate the prime at about a minimal noise level, at about a minimal fuel consumption level, or to modulate a specific emission, such as specific emission for carbon dioxide, oxides of nitrogen, and/or particulate matter.

In some embodiments, the method may include obtaining a current time, and selecting the noise reduction mode when the current time is later than a time threshold. In some embodiments, the method may include obtaining a current speed of the prime mover and selecting the fuel efficient mode when the current speed is faster than a speed threshold.

In some embodiments, the method may include obtaining a current location of the TRU, and selecting the noise reduction mode when the current location of the TRU is in a noise regulated zone and selecting the fuel efficiency mode when the current location of the TRU is not in a noise regulated zone. In some embodiments, the current location of the TRU can be obtained from, for example, a global positioning system.

In some embodiments, the transport refrigeration system may include an information source, a controller having a memory unit, and a prime mover engine control unit and a prime mover. In some embodiments, the memory unit can be configured to store a plurality of prime mover operation instruction sets; and the controller can be configured to obtain information from the information source and select a prime mover operation instruction set from the plurality of prime mover operation instruction sets based on the information obtained from the information source. The controller can instruct the prime mover engine control unit to operate the prime mover according to the selected prime mover operation instruction set. In some embodiments, the information source may be a global positioning system, a human machine interface and/or prime mover engine control unit.

Other features and aspects of the engine management approaches will become apparent by consideration of the following detailed description and accompanying drawings.

BRIEF DESCRIPTION OF THE DRAWINGS

FIGS. 1A and 1B illustrate two TRU units that can be used with the embodiments disclosed herein. FIG. 1A illustrates a container TRU coupled to a genset. FIG. 1B illustrates a trailer unit.

FIG. 4 illustrates exemplary parameters of fuel injection performed by an injection in one combustion cycle.

DETAILED DESCRIPTION

Figure 1A:
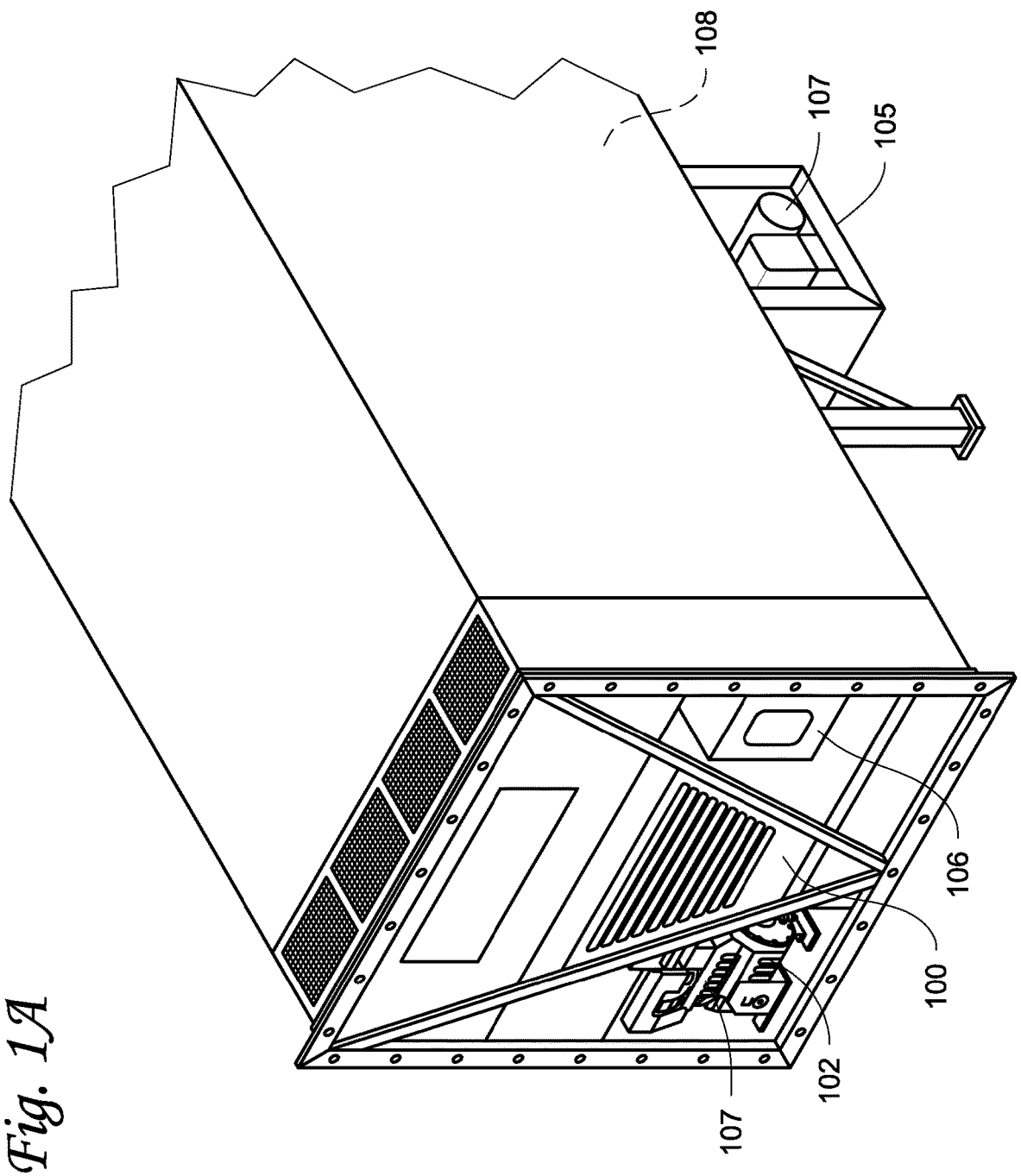

Some TRUs may require a prime mover, such as a diesel engine, to drive a generator to provide electric power to TRUs. In some configurations, the prime mover may be configured to be mechanically coupled to a compressor of the TRU. The operation of the prime mover can generate exhaust that may include environmental harmful $NO_x$, HC, CO, $CO_2$ and/or PM. The prime mover operation can also produce noise. Governmental regulations and local zoning regulations may require the prime mover to comply with specific prime mover exhaust and noise requirements. Apparatuses, such as a turbocharger, EGR and/or EGR cooler, DOC, and DPF have been developed to help reduce harmful exhaust emission and noise so as to meet regulation requirements. However, incorporating these apparatuses to a prime mover may cause high initial equipment cost and reoccurring maintenance cost. The added apparatuses to the prime mover may also increase the complexity and consequently reduce the reliability of the prime mover.

The prime mover may be equipped with a common rail (CR) system that is coupled with an ECU. The ECU can be configured to control some parameters, such as duration, timing and rate of fuel injection, of the prime mover operation. The ECU can be configured to control the performance of the prime mover by controlling these prime mover operation parameters.

In the following description of the illustrated embodiments, methods and systems to control a prime mover of a TRU or a genset of a TRU are described. In some embodiments, the system may include a prime mover, an ECU for the prime mover, an information source and a controller that is configured to obtain information from the information source and determine a prime mover operation mode based on the information obtained. In some embodiments, the controller may be configured to select a prime mover operation mode from a plurality of prime mover operation modes, which may include a fuel efficient mode, a noise reduction mode, an emission modulation mode, and a hybrid mode. In some embodiments, the controller can obtain a prime mover operation instruction set that is calibrated for the selected prime mover operation mode.

In some embodiments, the prime mover operation instruction set may include parameters such as duration, timing and a rate of fuel injection into the combustion chamber of the prime mover. By controlling the parameters of the fuel injection, the noise level, fuel efficiency level and/or emission level of the prime mover may be modulated.

In some embodiments, the prime mover operation instruction set can be calibrated to a slow ramped prime mover speed change to modulate the noise level of the prime mover.

References are made to the accompanying drawings that form a part hereof, and in which is shown by way of illustration of the embodiments in which the embodiments may be practiced. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings. The term "refrigerated transport unit" generally refers to, for example, a temperature controlled container chassis, container, or other types of transport unit, etc. The term "genset" generally refers to a genset, which generally include a prime mover and a generator. It is to be understood that the phraseology and terminology used herein is for the purpose of description and should not be regarded as limiting.

FIGS. 1A and 1B illustrates two different TRU units: a container TRU 100 for an insulated container 108 that can be coupled to a genet 105, and a trailer TRU 154 for a trailer unit 150, which can be used with the embodiments disclosed herein.

The container TRU 100 can be configured to be powered by a grid, or the dedicated genset 105. The container TRU 100 can have a compressor 102 and a control unit housing 106. The genset 105 is powered by a prime mover 107 to supply electric power to the compressor 102. The container TRU 100 is configured to control a space temperature inside the insulated container 108. In the configuration as illustrated in FIG. 1, the container TRU 100 is integrated to the insulated container 108 as a front wall of the insulated container 108.

FIG. 1B illustrates the trailer TRU 154 for a trailer 150. The trailer TRU 154 includes an integrated prime mover coupled to and driving a compressor of the trailer TRU 154.

It is to be appreciated that the embodiments disclosed herein are exemplary. The genset can be positioned at a side of the container or the trailer unit, and it can also be positioned underneath the container or the trailer unit. The embodiments described herein can be used in any other suitable temperature controlled apparatuses that use a genset, such as a railway car, a temperature controlled truck unit, a recreation vehicle, etc. The embodiments described herein can also generally be used with any device with a prime mover. For example, the embodiments described herein can be used with a prime mover of a tractor or other vehicles or an auxiliary power unit.

Figure 2:
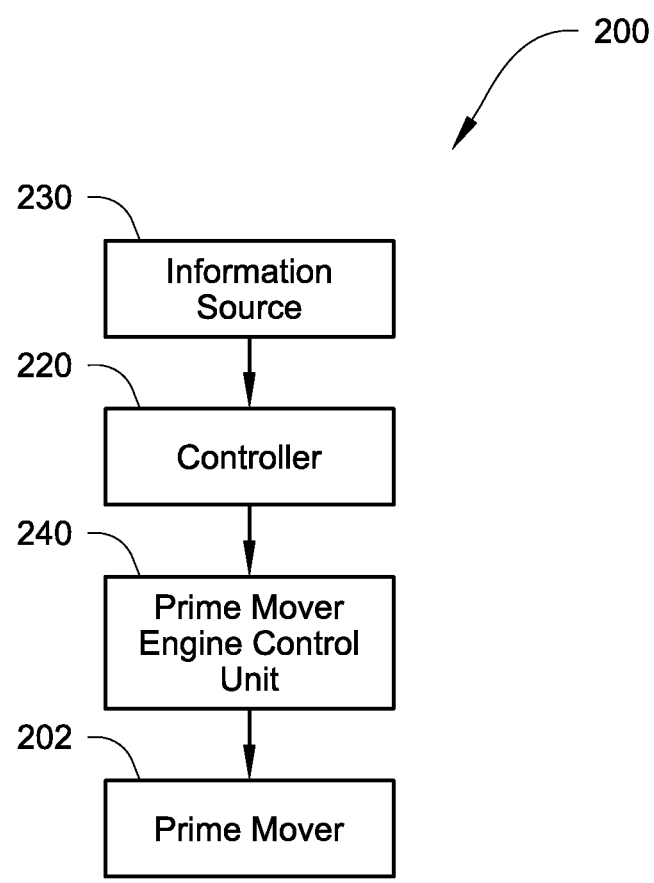
FIG. 2 illustrates one embodiment of a system to control a prime mover of a TRU.

Referring now to FIG. 2, an embodiment of a system 200 that is configured to control a prime mover 202 is illustrated. The system 200 generally includes an information source 230, a controller 220 that is configured to obtain information from the information source 230, a prime mover engine control unit (ECU) 240 and a prime mover 202 that is controlled by the prime mover ECU 240. As described later in the description, the information source 230 may be a GPS system, a human machine interface, an engine control unit, etc. In some embodiments, the information source can also be another TRU, FM radio, shortwave radio, weather forecast stations, etc. The controller 220 for example can be housed in housing 106 of FIG. 1.

In operation, the controller 220 can obtain information from the information source 230. The controller 220 can determine a prime mover operation mode based on the information obtained. The prime mover operation mode can be selected from a plurality of operation modes including a fuel efficiency mode, a noise reduction mode, an emission modulating mode, and a hybrid mode. After selecting the operation mode based on the information obtained, the controller 220 may be configured to obtain a prime mover operation instruction set that is calibrated for the selected operation mode. The controller 220 may then send the prime mover operation instruction set to the prime mover ECU 240 so as to operate the prime mover 202 accordingly.

In some embodiments, the prime mover operation instruction set may be calibrated for the noise reduction mode that is configured to operate the prime mover 202 at about a minimal operation noise level of the prime mover 202. In some embodiments, the prime mover operation instruction set may be calibrated for the fuel efficiency mode that is configured to operate the prime mover 202 at about a minimal fuel consumption level for the prime mover 202, or is configured to operate the prime mover 202 at about a minimal fuel consumption level for a specific load of the prime mover 202. In some embodiments, the prime mover operation instruction set may be calibrated for the emission modulation mode that is configured to operate the prime mover 202 to modulate an emission level of, for example, carbon dioxide, hydrocarbon, carbon monoxide, oxides of nitrogen, and/or particulate matter. In some embodiments, the prime mover operation instruction set may be calibrated to a hybrid mode(s). The hybrid mode(s) may be configured to operate the prime mover 202 for example to achieve some level of noise reduction (but not the minimal level of noise), and also achieve some level of fuel efficiency (but not the minimal level of fuel consumption).

Figure 3:
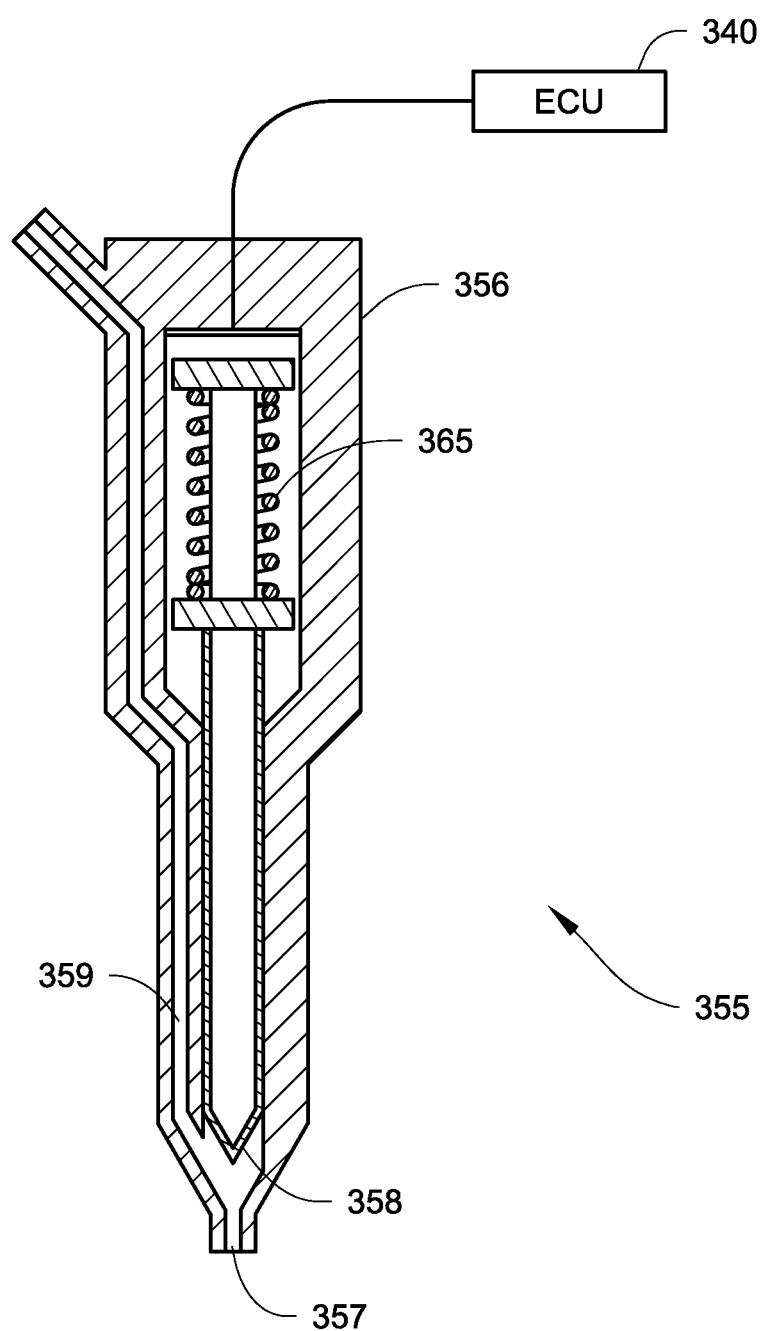
FIG. 3 illustrates a fuel injector that is controlled by an ECU.

Different technologies can be used to operate the engine at the various operation modes, such as the fuel efficiency mode, the noise reduction mode, the emission modulating mode, and the hybrid mode. Referring now to FIG. 3, an embodiment of an injector 355 is illustrated, which can be used to achieve the various operation modes. The injector 355 can have a housing 356, a nozzle 357, and a needle 358. The needle 358 is configured to be able to move up and down inside the housing 356. The injector 355 also has a fuel passage 359, which can be in fluid communication with, for example, a CR. When the needle 358 moves upwardly, the space between the needle 358 and the nozzle 357 increases; and when the needle 358 moves downwardly, the space between the needle 358 and the nozzle 357 decreases. The needle 358 can close off the nozzle 357 when the needle 358 reaches a bottom of the injector 355. The movement of the needle 358 can be controlled by an actuator 365, which is coupled to an ECU 340. By controlling the actuator 365, the ECU 340 can control the fuel injection process performed by the injector 355.

Each injector 355 is positioned inside a corresponding combustion chamber of a prime mover (not shown). In a diesel engine, fuel can be injected by the injector 355 to the combustion chamber during an engine cycle. By controlling the fuel injection process of the injectors 355, the ECU 340 can modulate the combustion inside the combustion chamber and therefore modulate the operation of the prime mover, such as the prime mover 202 as illustrated in FIG. 2.

In operation, the prime mover operation instruction set obtained by the controller 220 as shown in FIG. 2 may be transmitted to the ECU 340 and the prime mover operation instruction set may be configured to control the fuel injection event by the injector 355.

When an ECU controlled injector (such as the injector 355 illustrated in FIG. 3) is configured to be coupled to a CR, the ECU can control the injector to perform multiple fuel injections to spread out the fuel injection events during one combustion cycle. FIG. 4 illustrates an exemplary embodiment that includes three fuel injection events during one combustion cycle. In FIG. 4, the horizontal axis corresponds to time within one combustion cycle, and the vertical axis corresponds to a needle position. The curve 400 indicates the position of a needle (such as the needle 358 as illustrated in FIG. 3) of the injector at different time points in one combustion cycle. The higher the curve 400 is, the further away the needle from a nozzle of the injection and the more fuel injected to the combustion chamber. In FIG. 4, the three fuel injection events are reflected as section 401, 402 and 403. The curve 400 shows the timing, duration and a rate of fuel injection that can be controlled for each of the injection events 401, 402 and 403.

The timing, duration and rate of fuel injection (and/or other parameters) of each of the fuel injection events 401, 402 and 403 can be calibrated for a specific prime mover operation mode. For example, the prime mover operation modes can be a noise reduction mode, a $NO_x$ emission reduction mode, a CO emission reduction mode, a HC emission reduction mode, a $CO_2$ emission reduction mode, a HC emission reduction mode, a PM emission reduction mode, a fuel efficiency operation mode, etc. For each of the prime mover performance modes, the parameters of fuel injection of each injection event can be calibrated by testing, or provided by a prime mover manufacturer. The parameters that are calibrated for each of the prime mover operation mode then can be saved as a prime mover operation instruction set, which can be obtained by a controller such as the controller 220 as illustrated in FIG. 2.

In general, the noise reduction mode uses more fuel than the fuel efficient mode. In some embodiments, the fuel injection events 401, 402 and 403 may be calibrated for a hybrid mode that reduces the noise to an extent that is less than the noise reduction mode but is more fuel efficient than the noise reduction mode.

Figure 5A:
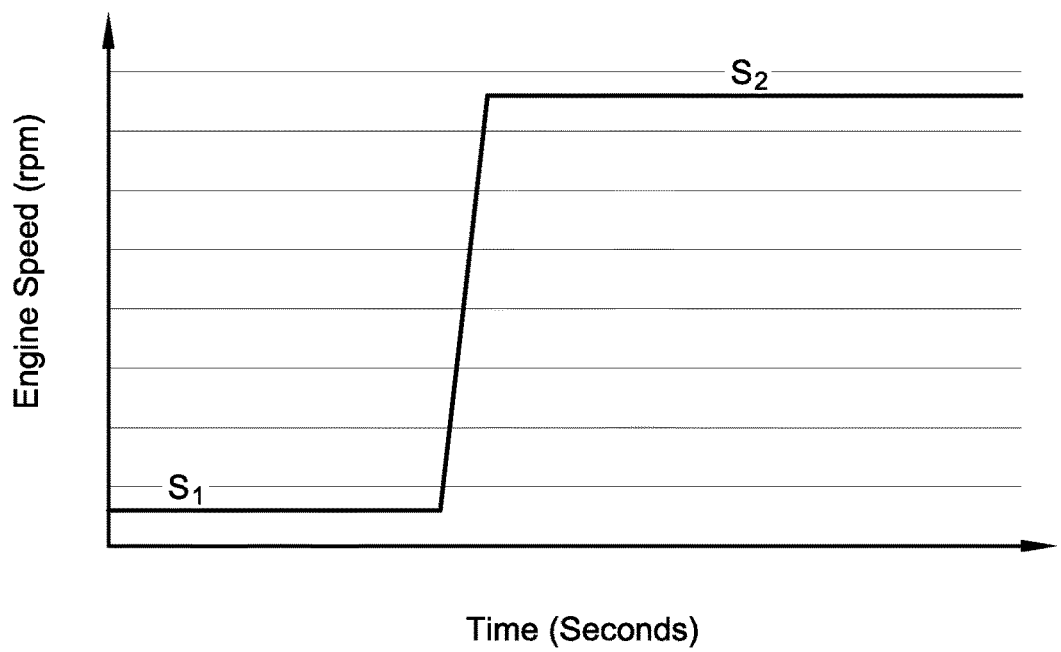
FIGS. 5A and 5B illustrate two modes of speed control for the prime mover.
Figure 5B:
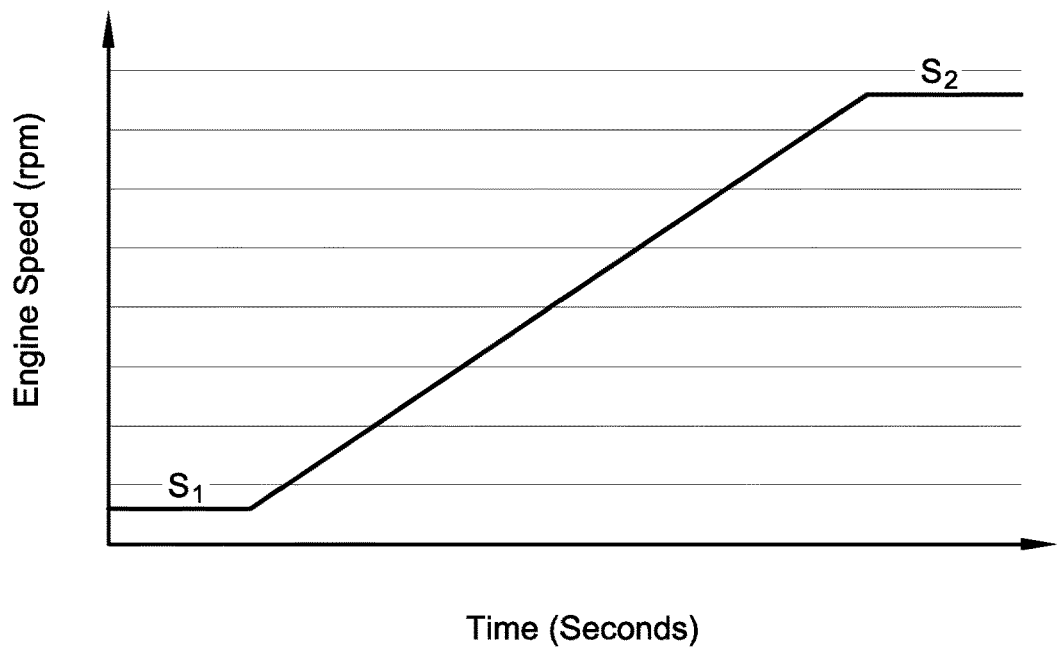

FIGS. 5A and 5B illustrate some other embodiments of prime mover engine control modes. FIG. 5A illustrates an abrupt stepped speed change mode, wherein a rotation speed of the prime mover change from a first speed s1 to a second speed s2 in a relatively short period of time. For example, in one embodiment, the prime mover can change from about 1200 rpm to about 2400 rpm in about 2 seconds. During the abrupt stepped speed change mode, the ECU can open up an injector fully to allow about a maximum amount of fuel to be delivered to the combustion chambers of the prime mover, and/or the ECU can open up an air inlet of the prime mover so that more air can get into the combustion chambers of the prime mover. The prime mover therefore can be accelerated at about the maximum rate.

FIG. 5B illustrates a soft ramped speed change mode. In this mode, the speed change from the first speed s1 to the second speed s2 takes a relatively longer period of time compared to the mode illustrated in FIG. 5A. For example, in one embodiment, the prime mover can change from about 1200 rpm to about 2400 rpm in about 15 seconds. In some other embodiments, the soft ramped speed change mode allows the speed change between the first speed s1 (e.g. 1200 rpm) and the second speed s2 (e.g. 2400 rpm) to happen in about 30 seconds.

During the soft ramped speed change mode, the ECU can be configured to increase the amount of fuel injected to the combustion chambers gradually so that the prime mover can be accelerated more gradually compared to the mode illustrated in FIG. 5A. Generally speaking, when the prime mover is operated in a soft ramped speed change mode as illustrated in FIG. 5B, operation noise of the prime mover may be reduced compared to the abrupt stepped speed change mode as illustrated in FIG. 5A. Accordingly, when the controller 220 as illustrated in FIG. 2 determines to operate the prime mover in a noise reduction mode, the controller 220 can be configured to obtain an instruction set that includes the soft ramped speed change. When the noise is not a concern, and/or the TRU requires fast cooling, the controller 220 can select the prime mover operation instruction set calibrated for the abrupt stepped speed change mode and instruct the prime mover ECU 240 to modulate the prime mover 202 accordingly.

It is to be noted that the speed change modes as illustrated in FIGS. 5A and 5B are exemplary. In some embodiments, the prime mover may be operated in a hybrid mode (not shown) that is configured to have a speed change rate situated between the abrupt speed change mode as illustrated in FIG. 5A and the soft ramped speed change mode as illustrated in FIG. 5B. In the hybrid mode, the noise level may be more than the soft ramped speed change mode but less than the abrupt speed change mode. The controller 220 may select the hybrid mode when the maximum noise reduction is not required but some noise reduction is desired. For example, in one embodiment, when the controller 220 selects the soft ramp speed change mode, the speed between s1 and s2 happens in about 15 seconds; when the abrupt speed change mode is selected, the speed change between s1 and s2 happens in about 2 seconds; and when the hybrid mode is selected, the speed change between s1 and s2 happens in about 9 seconds, which is between the 2 seconds in the abrupt speed change mode and the 15 seconds in soft ramp speed change mode.

Figure 6:
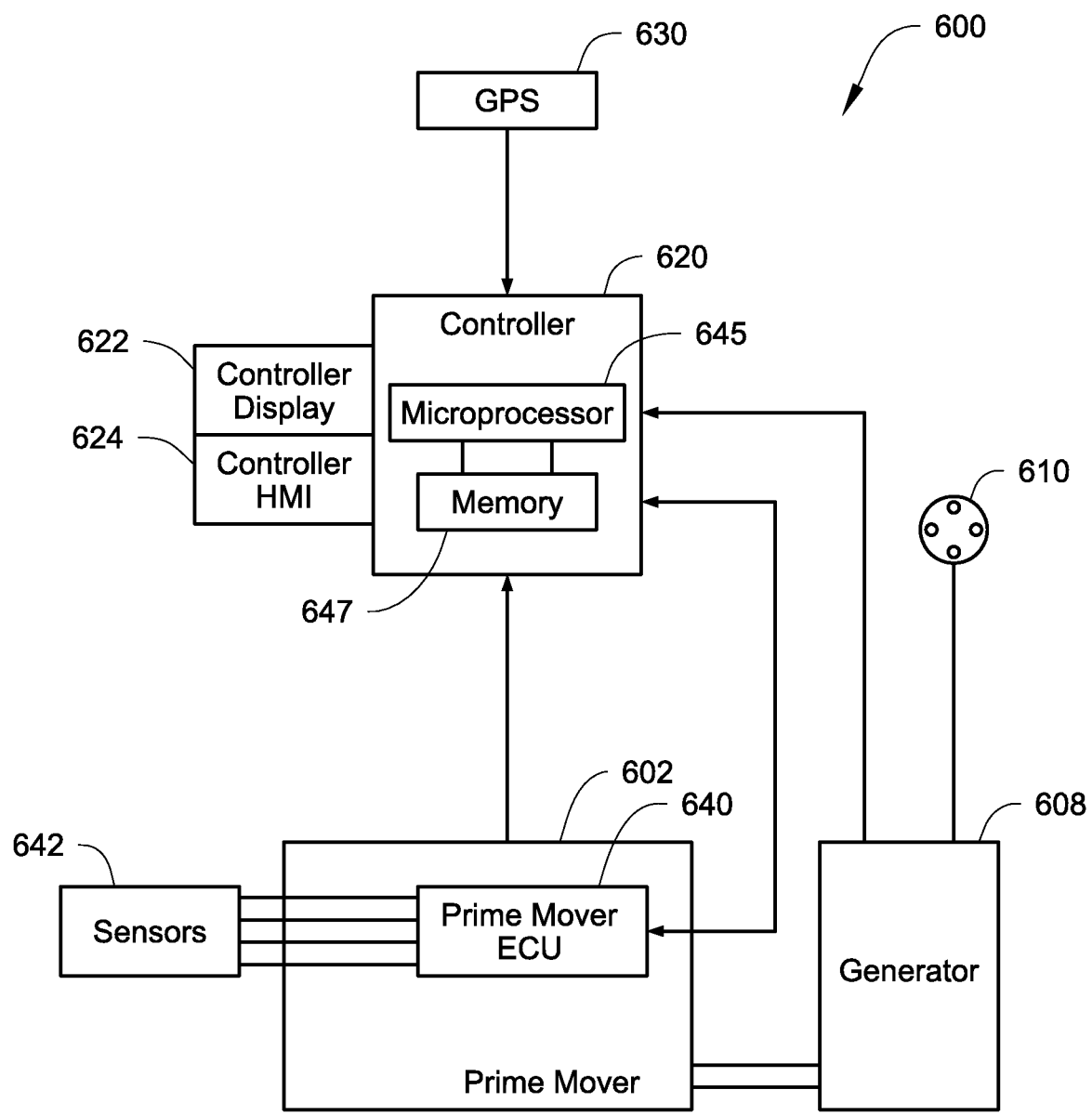
FIG. 6 illustrates another embodiment of a system to control a prime mover of a TRU.

Referring now to FIG. 6, another embodiment of a genset system of a TRU is illustrated. The system 600 may include a prime mover 602 and a generator 608. The prime mover 602 is coupled with the generator 608, and is configured to drive the generator 608 to produce electric power, which is provided to a power receptacle 610. The system 600 includes a controller 620. The controller 620 can be housed in the control unit housing 106 as shown in FIG. 1. The controller 620 is configured to be connected to a controller display 622 and a controller human machine interface (HMI) 624. The controller display 622 and the controller HMI 624 can be mounted on a front face of the control unit housing 106 so that a user, for example, can read the state of the controller 620 and input commands into the controller 620.

The controller 620 is configured to obtain information from an information source(s). As illustrated in FIG. 6, the information source can be the controller HMI 624, a globe positioning system (GPS) 630, a prime mover ECU 640 that is configured to receive information from a sensor(s) 642, and the generator 608. The controller HMI 624 can provide an interface for a user to input commands to the controller 620. The GPS 630 can receive signals from satellites and provide current location and/or time information. The generator 608 can provide an operation status of the generator 608, such as load of the generator 608, to the controller 620. The prime mover ECU 640 can provide an operation status, including fuel consumption and speed of the prime mover 602 to the controller 620. The ECU 640 can also be configured to communicate with one or more sensors 642, including for example, a crankshaft speed sensor to determine the operation speed of the prime mover 602 and an air mass sensor to determine an amount of air delivered to combustion chambers. The ECU 640 can then send the information collected by the sensor(s) 642 to the controller 620.

It is to be appreciated that the illustrated embodiment is merely exemplary. The controller 620 can be configured to obtain information from all of the above mentioned information sources, or can be configured to obtain information from some but not all of the above mentioned information sources. In some embodiments, the controller 620 can be configured to obtain information from other sources, such as from the refrigerated transport unit as illustrated in FIG. 1. In some embodiments, the information sources can be, for example, a satellite receiver, a weather forecast station, a FM or shortwave radio, information provided by another TRU, etc.

The controller 620 is configured to have a microprocessor 645 and a memory 647. The microprocessor 645 and the memory 647 can work together to determine the prime mover operation mode based on the information obtained from the information source(s) including for example the controller HMI 624, GPS 630, etc. The microprocessor 645 can be configured to select a prime mover operation mode from a plurality of prime mover operation modes, each of which may be associated with a prime mover operation instruction set that is calibrated for the prime mover operation mode. The prime mover engine control modes can be, for example, a noise reduction mode, a fuel efficiency mode, a hybrid mode, and/or an emission reduction mode. The plurality prime mover operation modes and associated operation instruction sets can be saved in the memory 647. After selecting the prime mover operation mode, the microprocessor 645 can retrieve the associated prime mover instruction set from the memory 647. The prime mover instruction set then is sent to the ECU 640. The ECU 640 is configured to control the operation of the prime mover 602 according to the instructions in the instruction set sent from the controller 647.

Figure 7:
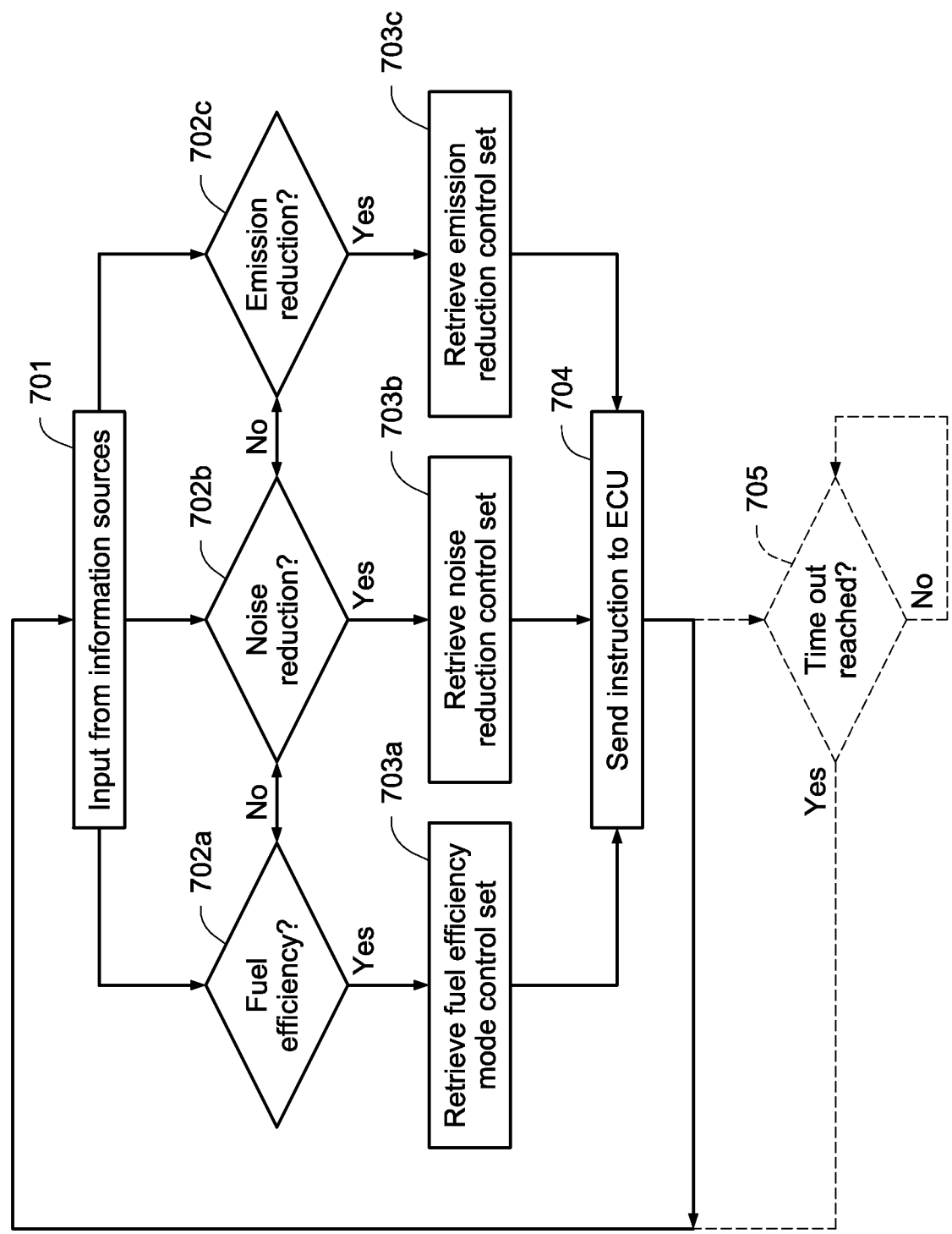
FIG. 7 illustrates a process that can be used by a controller of the system as shown in FIG. 6.

An exemplary process by which the prime mover instructions can be determined by the memory 647 and the microprocessor 645 is illustrated in FIG. 7. At 701, the microprocessor 645 can obtain information from an information source(s), which may include for example H MI, GPS, ECU, genset, etc. After receiving the information at 701, the microprocessor 645 can determine which prime mover operation mode to choose, such as a fuel efficiency mode at 702*a*, a noise reduction mode at 702*b* or an emission modulation 702*c*. For example, in some embodiments, a current location of the container TRU 100 as illustrated in FIG. 1 can be obtained by the GPS 630. After obtaining the current location information from the GPS 630, at 701 the microprocessor 645 can determine whether the TRU 100 is, for example, in a non-residential area, in a residential area, or in an emission regulated area by comparing the location information to a lookup table. In some embodiments, the controller 620 is configured to choose the fuel efficient mode 702*a* when for example the TRU 100 as illustrated in FIG. 1 is located in a non-residential area, or choose the noise reduction mode when the TRU 100 is in a residential area. The controller 620 can also be configured to choose the emission reduction mode 702*b* when emission reduction is desired for example in a region that is regulated by a government set emission standard.

The memory 647 can be configured to store a plurality of prime mover instruction sets, each of which can be calibrated for a specific prime move operation mode. The fuel efficient mode at 703*a* can be calibrated to operate the prime mover 602 at about a minimal fuel consumption level and generally consume relatively less fuel. The noise reduction mode at 703*b* can be calibrated to operate the prime mover 602 at about a minimal noise operation level for the prime mover 602 and generally emit less noise. For example, operation speed change for the prime mover 602 can be a soft ramped speed change as illustrated in FIG. 5B. The emission reduction mode at 703*c* can be calibrated to operate the prime mover 602 to reduce for example carbon dioxide emission, oxides of nitrogen emission, and/or particulate matter emission. It is appreciated that the memory 647 can also be configured to store a prime mover instruction set(s) for a hybrid mode(s). The hybrid mode(s) may be configured to operate the prime mover 602 to balance noise reduction, fuel efficiency and/or emission reduction.

Each of the prime mover operation modes at 703*a*, 703*b* or 703*c* may be associated to a corresponding instruction set that can be executed by the ECU 640 to control for example the fuel injection and/or air intake of the prime mover 602. The instruction sets can be stored in the memory 647, and the microprocessor 645 can obtain the instruction sets from the memory 647. The microprocessor 645 can then send the prime mover instruction set to the ECU 640 to be executed at 704.

In another embodiment, a user can select a particular prime mover operation mode (and/or a particular prime mover operation instruction set) from the controller HMI 624 and the selected prime mover operation mode can be received by the controller 645 at 701. The microprocessor 645 can determine which instruction set to select according to the user's selection at 702*a*, 702*b* and 702*c*, and obtained the corresponding instruction set at 703*a*, 703*b* or 703*c*.

The information sources, the operation modes, and/or the instruction sets can vary. For example, the information from the information source can be current time, a current altitude, latitude, and/or longitude of the TRU location, a current ambient temperature, current fuel amount in a fuel tank, a current prime mover load, a current generator load, a current refrigeration operation condition, etc. Based on the information obtained by the controller 620, the controller 620 can determine a status of the TRU and can select a corresponding prime mover mode and select a prime mover instruction set that is calibrated for the selected prime mover mode. The calibrated prime mover operation instruction sets can be stored in the memory 647. The microprocessor 645 can retrieve the stored operation instruction sets at 703*a*, 703*b* and 703*c*. In some embodiments, the controller 620 can be set at an automatic operation mode, in which the microprocessor 645 can evaluate information from the information source, and select different prime mover operation modes accordingly without any interference, for example, by a user. The method 700 proceeds to 701 to wait for an input after 704.

Some regulations include compliance associated with, for example, an altitude of the TRU. For example, the Environmental Protection Agency (EPA) has a requirement of a never to exceed (NTE) compliance for up to 5,500 feet. The TRU can obtain the altitude information for example from an altitude meter. The altitude meter may also be deduced from, for example, GPS signal, cellular signal, etc. The controller 620 can be configured to switch operation modes based on the altitude information. In some embodiments, for example, the TRU can be operated to meet the emission requirements when the TRU is below 5,500 feet, but can be configured to switch to, for example, a more fuel efficient operation mode when the TRU is at or above 5,500 feet.

In some embodiments, the information can be sent, for example, from another TRU. For example, when the TRUs are on the road, a TRU in the front may send information to a TRU that is in the back. The information may include, for example, local temperature, traffic speed, etc. The TRU in the back can switch operation mode based on the information received.

In some embodiments, the prime move operation modes can have an optional time out mode at 705. The time out mode 705 includes a specific predetermined period of time for each operation mode, for example about an hour. When the prime mover is operated at a particular prime mover operation mode longer than the associated predetermined period of time at 705, the controller 220 can terminate the particular prime mover operation mode. The method 700 then proceeds to 701 to wait for an input.

The prime mover operation instruction sets for the ECU to achieve the operation modes can be obtained, for example, by calibrating the prime mover through testing, for example through SAE noise test. The prime mover operation instruction sets, as discussed above, can be saved in the memory 647 as shown in FIG. 6.

The instruction modes and/or the associated prime mover operation instruction sets can be uploaded to the memory through a portable memory stick, a computer, a handheld device, etc. For example, the prime mover operation instruction sets can be calibrated, for example, in a laboratory by testing, and be uploaded to the controllers of the TRUs in the field.

It is appreciated that in some embodiments, the TRU can be operated in a predictive mode. Generally, the predictive mode can be configured to predict a future event for the TRU operation and modulate the current TRU operation to help the TRU operate in the future event. For example, the TRU can use technologies associated with, for example, geo-fencing and geo-tracking to obtain information that can help predict the TRU operation mode in a future time, and prepare the TRU for the future operation mode.

The term geo-fencing generally means a virtual perimeter based on geographic information that can be, for example, set up ahead of the TRU operation. The term geo-tracking generally means tracking the geographic information of the TRU during the TRU operation.

When, for example, the TRU is about to enter a geo-fence that requires a particular operation mode (e.g. the noise reduction mode), the cooling capability of the TRU may be limited inside the geo-fence. To help the TRU to maintain a temperature, for example, the TRU can be configured to cool down the TRU a little more before entering the geo-fence. This can help maintain the temperature of the TRU when the TRU is inside the geo-fence. The TRU may also predict the future operation event based on other information. For example, the TRU may receive a local temperature of the destination. When the local temperature is, for example, relatively high, the TRU can cool the TRU down more before reaching the destination. In some embodiments, using for example, the geo-fencing technologies, the TRU can include the regulation compliance of multiple locations. The TRU controller 620 can, for example, switch the operation modes when the TRU is in different geo-fence zones.

In some embodiments, the operation of the TRU may also be coordinated among a plurality of TRU units. For example, when a plurality of TRUs are stationed at a rest stop or a delivery yard, there may be a requirement directed to the maximum number of TRUs that can be operated at the same time. The TRUs may be configured to communicate with each other to determine which TRU are to be operated in compliance with the requirement.

In some embodiments, the information obtained, for example, by the controller 620 may be forwarded to an operator of the TRU, such as a truck driver, or remotely to an operator or an owner at a headquarter of the goods being shipped or to a shipping company. The information forwarded to the operator may include, for example, the current operation mode, the regulatory zone type, the available operation modes, information regarding how to change the operation modes, information about the regulation compliance, an operation log, operation time, location of the TRU, operation hours, etc. The operator can, for example, determine whether to change the operation mode, verify whether the operation mode is consistent with the regulation compliance and/or good storage requirements, keep the log, etc. The TRU can also include a memory unit to record information.

In some embodiments, the TRU controller 620 may be configured to operate the TRU based on, for example, a priority list. For example, when the TRU may need to comply with a regulatory requirement and a product storage requirement, the TRU may select the operation mode based on the priority list. If, for example, the goods in transportation require critical temperature regulation, the TRU may be configured to select the operation mode to meet the temperature requirement of the goods. If, for example, the goods in the transportation does not require temperature regulation, the TRU may be configured to select the operation mode to comply with the regulation requirements.

The TRU may also be configured to inform the operation of the TRU about a conflict of operation modes, so that the operator can make necessary change to the operation of the TRU. For example, when the goods require deep freezing, but the compliance with local regulations may hinder the TRU's capability to meet the deep freezing requirement, the operator may stop the TRU before entering the regulatory zone. The operator can, for example, lower the TRU's temperature before entering the regulator zone, or wait for example till night when the ambient temperature is relatively low so that the TRU can meet the deep freezing requirement more easily. In some embodiments, when for example meeting a plurality of regulatory requirements is necessary, the TRU can operate the TRU to meet for example, the most critical regulatory requirements. For example, the noise compliance may in some instances take a lower priority to the emission compliance.

Figure 8A:
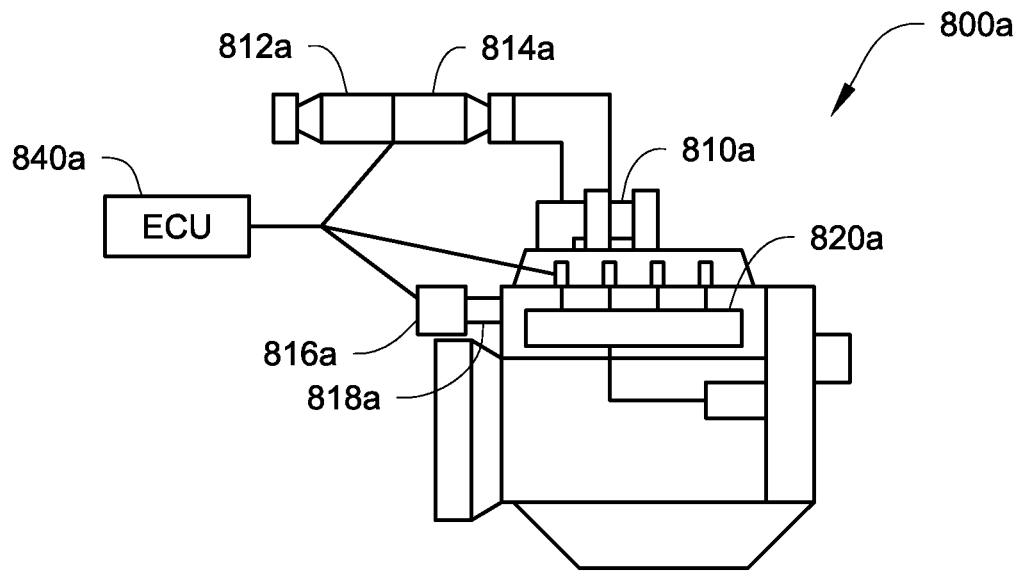
FIGS. 8A to 8D illustrate exemplary prime mover configurations with which the embodiments described herein can be practiced.
Figure 8B:
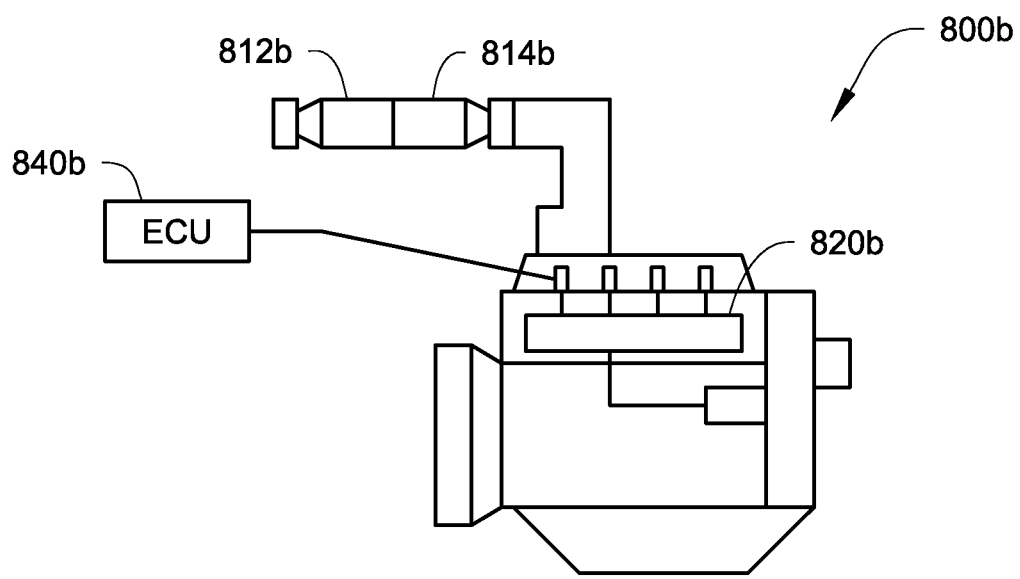
Figure 8C:
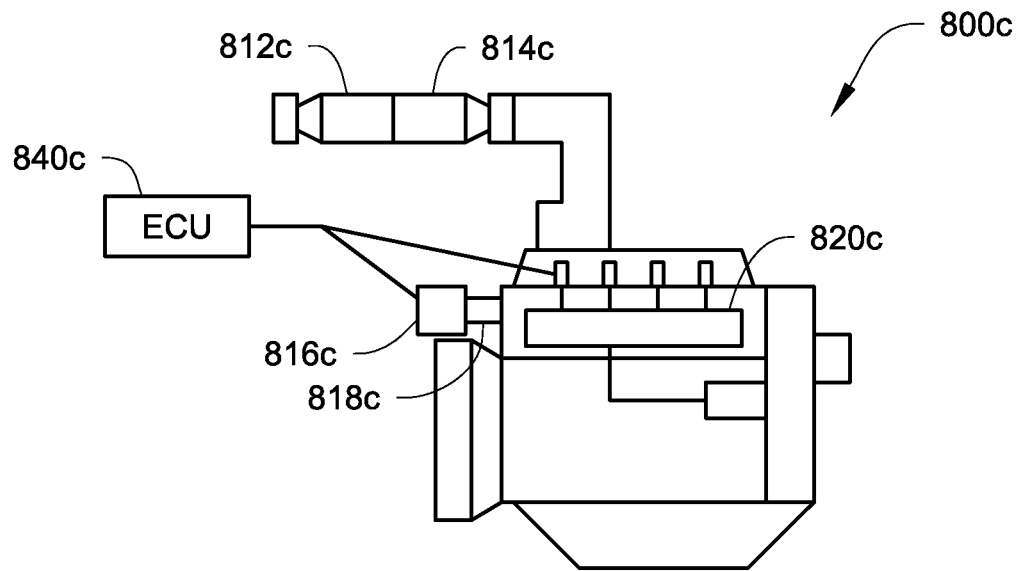
Figure 8D:
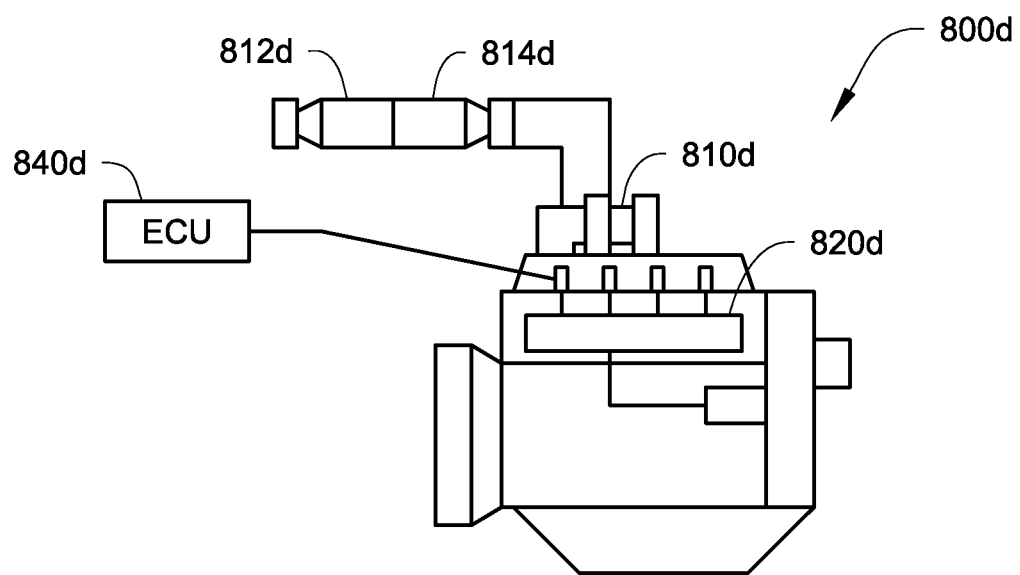

FIGS. 8A to 8D illustrate different embodiments of prime movers, which may include different technologies to help operate the prime movers at different operation modes. Generally, the CR equipped prime mover can work with other technologies such as a DPF, a DOC, an EGR, etc. to help the prime mover to operate at different operation modes FIG. 8A illustrates a prime mover 800a that is equipped with a turbocharger 810a, a DPF 812a, a DOC 814a, an EGR 816a and/or EGR cooler 818a, and a CR 820a. An ECU 840a can be configured to monitor and/or control the performance of the DPF 812a, DOC 814a and EGR 816a and/or injectors of the CR 820a. In FIG. 8B, a prime mover 800b is equipped with a DPF 812b, a DOC 814b, and a CR 820b. An ECU 840b can be configured to monitor and/or control the performance of the DPF 812b, DOC 814b and/or injectors of the CR 820b. In FIG. 8C, a prime mover 800c is equipped with a DPF 812c, a DOC 814c, an EGR 816c and/or EGR cooler 818c, and a CR 820c. An ECU 840c can be configured to monitor and/or control the performance of the DPF 812c, the DOC 814c, the EGR 816c and/or EGR cooler 818c and injectors of the CR 820c. In FIG. 8D, a prime mover 800d is equipped with a turbocharger 810d, a DPF 812d, a DOC 814d, and a CR 820d. An ECU 840d can be configured to monitor and/or control the performance of the DPF 812d, the DOC 814d, and/or injectors of the CR 820d.

The ECUs 820a to 820d can be configured to work with a controller, such as the controller 620 as shown in FIG. 6. As discussed earlier, DPF, DOC, EGR and CR can help reduce harmful emissions of $NO_x$, HC, CO, $CO_2$ and PM. DPF, DOC, EGR and CR working together can also help the prime mover to comply with the emission regulations. However, installation of all of these devices to the prime mover may increase the initial equipment cost and reoccurring maintenance cost. In the configurations as illustrated in FIGS. 8B to 8D, EGR/EGR cooler and/or turbocharger are not equipped to the prime movers 800b, 800c and 800d. In these configurations, the operation of the prime movers 800b, 800c and 800d can be specifically calibrated to compensate for at least some effect (such as $NO_x$, HC, CO, $CO_2$ and/or PM reduction effect) that can be achieved by the devices that may not be equipped. The calibrated prime mover operation instruction sets can be stored in the memory 647 as shown in FIG. 6. For example, in an exemplary "emission compliance mode," the microprocessor 645 of the controller 620 can instruct the ECU 640 to performs the instruction set that is calibrated for the specific emission goal so as to help the prime mover comply with the emission regulations. Therefore, the initial equipment cost and the reoccurring maintenance cost can be reduced because of the reduced number of installed apparatuses to the prime mover.

It is to be appreciated that the prime mover may undergo upgrade during the service life of the prime mover. After upgrading, the prime mover can be recalibrated for specific performance modes and new prime mover operation instruction sets can be generated by testing. The new operation instruction sets can replace the former operation instruction sets stored in the memory 647 as shown in FIG. 6. The controller 620 will then be able to control the upgraded prime mover.

Aspects

Any of aspects 1-16 can be combined with any of aspects 17-20.

Aspect 1. A method to control a prime mover of a refrigerated transport unit comprising:
obtaining information from an information source;
determining a prime mover operation mode based on the information obtained from the information source;

obtaining a prime mover operation instruction set that is calibrated for the prime mover operation mode; and operating the prime mover according to the prime mover operation instruction set;

wherein the prime mover operation mode is selected from one or more of a fuel efficient mode, a noise reduction mode, an emission modulation mode and a hybrid mode.

Aspect 2. The method of aspect 1, wherein the prime mover operation instruction set calibrated for the fuel efficient mode includes a duration, a timing and a rate of fuel injection for an injector of the prime mover, and the duration, the timing and the rate of fuel injection are calibrated to operate the prime mover at about a minimal fuel consumption level.

Aspect 3. The method of aspects 1-2, wherein the prime mover operation instruction set calibrated for the noise reduction mode includes a duration, a timing and a rate of fuel injection for an injector of the prime mover, and the duration, the timing and the rate of fuel injection are calibrated to operate the prime mover at about a minimal noise level.

Aspect 4. The method of aspects 1-3, wherein the prime mover operation instruction set calibrated for the noise reduction mode includes increasing a speed of the prime mover at about 5% of a maximum RPM of the prime mover per second.

Aspect 5. The method of aspects 1-4, wherein the prime mover operation instruction set calibrated for the emission modulation mode includes a duration, a timing and a rate of fuel injection for an injector of the prime mover, and the duration, the timing and the rate of fuel injection are calibrated to operate the prime mover to achieve an emission goal.

Aspect 6. The method of aspect 5, wherein the emission goal is selected from one or more of carbon dioxide reduction, oxides of nitrogen reduction, and particulate matter reduction.

Aspect 7. The method of aspect 6, wherein the emission goal is a location specific emission standard that includes specific emission requirements for carbon dioxide, oxides of nitrogen, and particulate matter.

Aspect 8. The method of aspects 1-7, wherein the prime move instruction set calibrated for the hybrid mode includes a duration, a timing and a rate of fuel injection for an injector of the prime mover, and the duration, the timing and the rate of fuel injection are calibrated to operate the prime mover below a maximum fuel consumption level and a maximum noise level, and over a minimum fuel consumption level and a minimum noise level.

Aspect 9. The method of aspects 1-8, wherein the information source includes a global positioning system that is configured to obtain a current position of the transport refrigeration unit.

Aspect 10. The method of aspects 1-9, wherein the information source includes a human machine interface.

Aspect 11. The method of aspects 1-10, wherein the information is a current time.

Aspect 12. The method of aspects 1-11, wherein the information is a current speed of the transport refrigeration unit.

Aspect 13. The method of aspects 8-12, wherein the determining a prime mover operation mode based on the information obtained from the information source includes selecting the noise reduction mode when the current position of the transport refrigeration unit is in a noise regulated zone.

Aspect 14. The method of aspects 8-13, wherein the determining a prime mover operation mode based on the information obtained from the information source includes selecting the fuel efficient mode when the current position of the transport refrigeration unit is not in a noise regulated zone.

Aspect 15. The method of aspects 11-14, wherein the determining a prime mover operation mode based on the information obtained from the information source includes selecting the noise reduction mode when the current time is later than a time threshold.

Aspect 16. The method of aspects 12-15, wherein the determining a prime mover operation mode based on the information obtained from the information source includes selecting the fuel efficient mode when the current speed is faster than a speed threshold.

Aspect 17. A transport refrigeration system comprising:
a prime mover;
a controller having a memory unit;
an information source; and
a prime mover engine control unit;
wherein the memory unit is configured to store a plurality of prime mover operation instruction sets, and the controller is configured to select a prime mover instruction set from the plurality of prime mover operation instruction sets based on information received from the information source and send the selected prime mover operation instruction set to the prime mover engine control unit to operate the prime mover.

Aspect 18. The transport refrigeration system of aspect 17, wherein the information source is a global positioning system.

Aspect 19. The transport refrigeration system of aspects 17-18, wherein the information source is a human machine interface.

Aspect 20. The transport refrigeration system of aspects 17-19, wherein the plurality of prime mover operation instruction sets are calibrated to operate the prime mover to use about a minimal fuel consumption level, to emit about a minimal noise level, and to emit below a carbon dioxide emission threshold, an oxides of nitrogen emission threshold, or a particulate matter emission threshold.

With regard to the foregoing description, it is to be understood that changes may be made in detail, especially in matters of the construction materials employed and the shape, size and arrangement of the parts without departing from the scope of the present invention. It is intended that the specification and depicted embodiment to be considered exemplary only, with a true scope and spirit of the invention being indicated by the broad meaning of the claims.

What is claimed is:

1. A method to control a prime mover of a refrigerated transport unit comprising:
   obtaining information from an information source including information indicating a current geographic location of the refrigerated transport unit;
   determining a prime mover operation mode based on the information, wherein determining the prime mover operation mode based on the information includes:
      determining a geographic specific regulation at the current geographic location of the refrigerated transport, and
      selecting between a plurality of prime mover operation modes in order to comply with the geographic specific regulation, wherein selecting between the plurality of prime mover operation modes is based on a modifiable priority list that prioritizes between complying with a geographic specific regulation and meeting a product storage requirement of cargo stored in the refrigerated transport unit;

obtaining a prime mover operation instruction set that is calibrated for the selected prime mover operation mode; and operating the prime mover to power or drive a compressor of the refrigerated transport unit according to the prime mover operation instruction set;

wherein the plurality of prime mover operation modes includes a noise reduction mode that operates the prime mover near a minimal noise operation level, and wherein by selection of the noise reduction mode the prime mover is operated for powering or driving the compressor according to the prime mover operation instruction set calibrated to the noise reduction mode which instructs the prime mover to operate to reduce noise by switching from an abrupt stepped speed change mode to a soft ramped speed change mode, wherein during the soft ramped speed change mode the prime mover is accelerated more gradually compared to the abrupt stepped speed change mode.

2. The method of claim 1, wherein the plurality of prime mover operation modes includes a fuel efficient mode that operates the prime mover near a minimal fuel consumption level, and wherein the prime mover operation instruction set calibrated for the fuel efficient mode includes a duration, a timing and a rate of fuel injection for an injector of the prime mover, and the duration, the timing and the rate of fuel injection are calibrated to operate the prime mover at about a minimal fuel consumption level.

3. The method of claim 1, wherein the prime mover operation instruction set calibrated for the noise reduction mode includes a duration, a timing and a rate of fuel injection for an injector of the prime mover, and the duration, the timing and the rate of fuel injection are calibrated to operate the prime mover at about a minimal noise level.

4. The method of claim 1, wherein the soft ramped speed change mode includes increasing a speed of the prime mover at about 5% of a maximum RPM of the prime mover per second.

5. The method of claim 1, wherein the plurality of prime mover operation modes includes an emission modulation mode that operates the prime mover to reduce at least one of carbon dioxide emission, oxides of nitrogen emission, and particulate matter emission, and wherein the prime mover operation instruction set calibrated for the emission modulation mode includes a duration, a timing and a rate of fuel injection for an injector of the prime mover, and the duration, the timing and the rate of fuel injection are calibrated to operate the prime mover to achieve an emission goal.

6. The method of claim 5, wherein the emission goal is selected from one or more of carbon dioxide reduction, oxides of nitrogen reduction, and particulate matter reduction.

7. The method of claim 6, wherein the emission goal is a location specific emission standard that includes specific emission requirements for carbon dioxide, oxides of nitrogen, and particulate matter.

8. The method of claim 1, wherein the plurality of prime mover operation modes includes a hybrid mode that operates the prime mover to balance two or more of the noise reduction, a fuel efficiency and an emission reduction mode, and wherein the prime move instruction set calibrated for the hybrid mode includes a duration, a timing and a rate of fuel injection for an injector of the prime mover, and the duration, the timing and the rate of fuel injection are calibrated to operate the prime mover below a maximum fuel consumption level and a maximum noise level, and over a minimum fuel consumption level and a minimum noise level.

9. The method of claim 1, wherein the information source includes a global positioning system that is configured to obtain a current position of the transport refrigeration unit.

10. The method of claim 1, wherein the information source includes a human machine interface.

11. The method of claim 1, wherein the information includes a current time of day where the refrigerated transport unit is geographically located.

12. The method of claim 1, wherein the information includes a current speed of the transport refrigeration unit.

13. The method of claim 9, wherein determining the prime mover operation mode based on the information includes selecting the noise reduction mode when the current position of the transport refrigeration unit is in a noise regulated zone.

14. The method of claim 9, wherein determining the prime mover operation mode based on the information includes selecting a fuel efficient mode when the current position of the transport refrigeration unit is not in a noise regulated zone.

15. The method of claim 11, wherein determining the prime mover operation mode based on the information includes selecting the noise reduction mode when the current time is later than a time threshold.

16. The method of claim 12, wherein determining the prime mover operation mode based on the information includes selecting a fuel efficient mode when the current speed is faster than a speed threshold.

17. A transport refrigeration system comprising:
a compressor;
a prime mover that powers or drives the compressor;
a controller having a memory unit;
an information source; and
a prime mover engine control unit;
wherein the memory unit is configured to store a plurality of prime mover operation instruction sets that are each calibrated to a prime mover operation mode, and the controller is configured to:
obtain information from an information source including information indicating a current geographic location of the transport refrigeration system,
determine a geographic specific regulation at the current location of the transport refrigeration system,
select between a plurality of prime mover operation modes in order to comply with the geographic specific regulation, wherein selection between the plurality of prime mover operation modes is based on a modifiable priority list that prioritizes between complying with a geographic specific regulation and meeting a product storage requirement of cargo stored in the refrigerated transport unit,
obtain a particular prime mover instruction set calibrated for a particular prime mover operation mode selected between the plurality of prime mover operation modes, and send the particular prime mover operation instruction set to the prime mover engine control unit to operate the prime mover,
wherein the plurality of prime mover operation modes includes a noise reduction mode operates the prime mover near a minimal noise operation level, and
wherein by selection of the noise reduction mode the prime mover is operated for powering or driving the compressor according to the prime mover operation instruction set calibrated to the noise reduction mode which instructs the prime mover to operate to reduce noise by switching from an abrupt stepped speed change mode to a soft ramped speed change mode, wherein during the soft ramped speed change mode the prime mover is accelerated more gradually compared to the abrupt stepped speed change mode.

18. The transport refrigeration system of claim 17, wherein the information source is a global positioning system.

19. The transport refrigeration system of claim 17, wherein the information source is a human machine interface.

20. The method of claim 1, wherein determining the geographic specific regulation at the current geographic location of the transport refrigeration system includes determining whether the transport refrigeration system is in one of a non-residential area, in a residential area, and an emission regulated area by comparing the current geographic location to a lookup table, and
   wherein selecting between the plurality of prime mover operation modes includes selecting the noise reduction mode when the transport refrigeration system is located in a residential area.

21. The method of claim 1, further comprising switching the selected prime mover operation mode to a time out mode when the prime mover is operated in the selected prime mover operation mode for a predetermined period of time, wherein the time out mode terminates the selected prime mover operation mode.

22. A method to control a prime mover of a refrigerated transport unit comprising:
   obtaining information from an information source including information indicating a current geographic location of the refrigerated transport unit;
   determining a prime mover operation mode based on the information, wherein determining the prime mover operation mode based on the information includes:
      determining a geographic specific regulation at the current geographic location of the refrigerated transport, and
      selecting between a plurality of prime mover operation modes in order to comply with the geographic specific regulation;
   obtaining a prime mover operation instruction set that is calibrated for the selected prime mover operation mode;
   operating the prime mover to power or drive a compressor of the refrigerated transport unit according to the prime mover operation instruction set; and
   switching the selected prime mover operation mode to a time out mode when the prime mover is operated in the selected prime mover operation mode for a predetermined period of time, wherein the time out mode terminates the selected prime mover operation mode;
   wherein the plurality of prime mover operation modes includes a noise reduction mode that operates the prime mover near a minimal noise operation level, and
   wherein by selection of the noise reduction mode the prime mover is operated for powering or driving the compressor according to the prime mover operation instruction set calibrated to the noise reduction mode which instructs the prime mover to operate to reduce noise by switching from an abrupt stepped speed change mode to a soft ramped speed change mode, wherein during the soft ramped speed change mode the prime mover is accelerated more gradually compared to the abrupt stepped speed change mode.

* * * * *